United States Patent
Bill (10) Patent No.: US 10,714,199 B1
(45) Date of Patent: Jul. 14, 2020

(54) PUF LATCH FOR OTP MEMORY ARRAYS AND METHOD OF OPERATION

(71) Applicant: Synopsys, Inc., Mountain View, CA (US)

(72) Inventor: Colin Stewart Bill, Cupertino, CA (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 16/396,355

(22) Filed: Apr. 26, 2019

Related U.S. Application Data (60) Provisional application No. 62/669,220, filed on May 9, 2018.

(51) Int. Cl.
| | |
|---|---|
| *G11C 16/04* | (2006.01) |
| *G11C 16/34* | (2006.01) |
| *H04L 9/32* | (2006.01) |
| *G11C 17/18* | (2006.01) |
| *G11C 16/26* | (2006.01) |

(52) U.S. Cl.
CPC ............ *G11C 16/349* (2013.01); *G11C 16/26* (2013.01); *G11C 16/3459* (2013.01); *G11C 17/18* (2013.01); *H04L 9/3278* (2013.01)

(58) Field of Classification Search
CPC ..... G11C 16/349; G11C 16/26; G11C 16/3459; G11C 17/18
USPC .................................................. 365/185.21
See application file for complete search history.

(56) References Cited

U.S. PATENT DOCUMENTS

| | | | |
|---|---|---|---|
| 9,613,714 B1 * | 4/2017 | Wong ..................... | G11C 16/24 |
| 10,103,733 B1 * | 10/2018 | Gurrieri ........... | H03K 19/17768 |
| 10,468,104 B1 * | 11/2019 | Anand .................. | G11C 16/10 |

* cited by examiner

*Primary Examiner* — Vu A Le
(74) *Attorney, Agent, or Firm* — Fenwick & West LLP (57) ABSTRACT

A physical unclonable function (PUF) circuit generates one or more bit values. The PUF circuit includes a first one-time programmable (OTP) memory cell, a second OTP memory cell, and a latch circuit connected to the first and second OTP memory cells. The latch circuit initiates programming of the first and second OTP memory cells, detects a faster programming OTP memory cell of the first and second OTP memory cells, inhibits programming of a slower programming OTP memory cell of the first and second OTP memory cells, and stores a first bit value when the first OTP memory cell is the faster programming OTP memory cell and a second bit value when the second OTP memory cell is the faster programming OTP memory cell.

20 Claims, 10 Drawing Sheets

Example of PUF programming flow using PUF-Latch

FIG. 9

PUF LATCH FOR OTP MEMORY ARRAYS AND METHOD OF OPERATION

CROSS REFERENCE TO RELATED APPLICATION

This application claims the benefit of U.S. Provisional Application No. 62/669,220, filed May 9, 2018, which is incorporated by reference in its entirety.

BACKGROUND

Physical entities sometimes possess characteristics which vary randomly from entity to entity. This variability can provide for a Physically Unclonable Function (PUF) which can be used in security technology. Security circuits use this PUF 'fingerprint' as an input to generating further random codes related with across-network communications or for gating access to secure parts of an electronic device or system. PUF circuits can, for example, generate a random bit word of 256 to 1024 bits (or more) which can be used to generate a recognized response from an input challenge, to authenticate the user and hardware. The random bit pattern generated by the PUF can represent a unique 'fingerprint' or serial number for each specific occurrence of a functional electronic die. The randomness of the PUF generated word is dependent upon the randomness of the varying physical quantity, and specifically how the physical randomness is captured by the PUF circuit.

SUMMARY

Embodiments relate to a PUF circuit implementation using oxide-breakdown OTP memory bit-cells as the source of randomness. Some embodiments include a physical unclonable function (PUF) circuit. The PUF circuit includes: a first one-time programmable (OTP) memory cell; a second OTP memory cell; and a latch circuit connected to the first and second OTP memory cells. The latch circuit is configured to: initiate programming of the first and second OTP memory cells; detect a faster programming OTP memory cell of the first and second OTP memory cells; inhibit programming of a slower programming OTP memory cell of the first and second OTP memory cells; and store a first bit value when the first OTP memory cell is the faster programming OTP memory cell and a second bit value when the second OTP memory cell is the faster programming OTP memory cell.

In some embodiments, the latch circuit configured to initiate the programming of the first and second OTP memory cells includes the latch circuit being configured to initiate a soft programming for the first OTP memory cell and the second OTP memory cell using a first current level. The latch circuit is further configured to perform a hard programming of the faster programming OTP memory cell using a second current level higher than the first current level.

In some embodiments, the PUF circuit further includes a third OTP memory cell and a fourth OTP memory cell connected to the latch circuit. The latch circuit is further configured to perform a hard programming of the third OTP memory cell when the first bit value is stored by the latch circuit and perform a hard programming of the fourth OTP memory cell when the second bit value is stored by the latch circuit.

In some embodiments, the latch circuit is configured to inhibit the programming of the slower programming OTP memory cell by increasing a bit line voltage of the slower programming OTP memory cell to lower a field on an oxide of the slower programming OTP memory cell.

In some embodiments, the latch circuit is configured to inhibit the programming of the slower programming OTP memory cell by shutting off a pass device on a bit line of the slower OTP memory cell to disable a program current path of the slower OTP memory cell.

In some embodiments, the latch circuit is configured to detect the faster programming OTP memory cell based on conductivities of the first and second OTP memory cells over time.

In some embodiments, the latch circuit includes a tri-state driver configured to provide the first bit value or the second bit value stored in the latch circuit.

In some embodiments, the first OTP memory cell, the second OTP memory cell, and the latch circuit form a symmetrical structure.

In some embodiments, the PUF circuit further includes: a pass device connecting the latch circuit to the first OTP memory cell; and a pull-up device connected between the pass device and the first OTP memory cell.

In some embodiments, the first and second OTP memory cells form a first bit cell pair. the PUF circuit further includes: a second bit cell pair including a third OTP memory cell and a fourth OTP memory cell; and a decoder configured to selectively connect the latch circuit to the first bit cell pair and the second bit cell pair.

Some embodiments include a method for generating a bit value. The method includes: initiating, by a latch circuit connected to a first one-time programmable (OTP) memory cell and a second OTP memory cell, programming of the first and second OTP memory cells; detecting, by the latch circuit, a faster programming OTP memory cell of the first and second OTP memory cells; inhibiting, by the latch circuit, programming of a slower programming OTP memory cell of the first and second OTP memory cells; and storing, by the latch circuit, a first bit value when the first OTP memory cell is the faster programming OTP memory cell and a second bit value when the second OTP memory cell is the faster programming OTP memory cell.

In some embodiments, initiating the programming of the first and second OTP memory cells includes initiating a soft programming for the first OTP memory cell and the second OTP memory cell using a first current level. The method further includes initiating a hard programming of the faster programming OTP memory cell using a second current level higher than the first current level.

In some embodiments, the latch circuit is further connected to a third OTP memory cell and fourth OTP memory cell. The method further includes performing a hard programming of the third OTP memory cell when the first bit value is stored by the latch circuit and performing a hard programming of the fourth OTP memory cell when the second bit value is stored by the latch circuit.

In some embodiments, inhibiting programming of the slower programming OTP memory cell includes increasing a bit line voltage of the slower programming OTP memory cell to lower a field on an oxide of the slower OTP memory cell.

In some embodiments, inhibiting programming of the slower OTP memory cell includes shutting off a pass device on a bit line of the slower OTP memory cell to disable a program current path of the slower OTP memory cell.

In some embodiments, the method further includes outputting the first bit value or the second bit value from the latch circuit using a tri-state driver.

In some embodiments, detecting the faster programming OTP memory cell is based on conductivities of the first and second OTP memory cells over time.

In some embodiments, the latch circuit, the first OTP memory cell, and the second OTP memory cell form a physical unclonable function (PUF) circuit that includes a symmetrical structure.

Some embodiments include an electronic device including a plurality of physically unclonable function (PUF) circuits. Each PUF circuit includes a first one-time programmable (OTP) memory cell; a second OTP memory cell; and a latch circuit connected to the first and second OTP memory cells. The latch circuit is configured to: initiate programming of the first and second OTP memory cells; detect a faster programming OTP memory cell of the first and second OTP memory cells; inhibit programming of a slower programming OTP memory cell of the first and second OTP memory cells; and store a first bit value when the first OTP memory cell is the faster programming OTP memory cell and a second bit value when the second OTP memory cell is the faster programming OTP memory cell.

In some embodiments, the latch circuit configured to initiate the programming of the first and second OTP memory cells includes the latch circuit being configured to initiate a soft programming for the first OTP memory cell and the second OTP memory cell using a first current level. The latch circuit is further configured to initiate a hard programming of the faster programming OTP memory cell using a second current level higher than the first current level.

Other objects, features, and advantages of the present invention will become apparent upon consideration of the following detailed description and the accompanying drawings, in which like reference designations represent like features throughout the figures.

BRIEF DESCRIPTION OF THE DRAWINGS

Figure (FIG. 1A shows a generalized cross section of an OTP memory bit, in accordance with some embodiments.

The figures depict, and the detail description describes, various non-limiting embodiments for purposes of illustration only

DETAILED DESCRIPTION

Embodiments relate to a PUF circuit implementation using oxide-breakdown OTP memory bit-cells as the source of randomness. The oxide breakdown is highly variable over the bit-cells in the array due to the random nature of the thickness of the oxide and of the shape and quality of the oxide. Once the oxide has broken down, it maintains its state without much change. At a sufficiently low read operation voltage, the unbroken oxide can also maintain its state without degrading over time.

The PUF circuit design demonstrates an OTP PUF LATCH circuit, which forms part of the generation of a 512b (or greater, or less) random bit pattern, which can be used as a unique die signature, or as an input seed to a random number generator, or other function, to enhance secure access. The OTP-PUF LATCH connects to two OTP memory bit-cells. On entering a program mode to program the OTP bits, where both bits have an equal chance to program, only one of the two bits is programmed. The bit that programs is random, based on minor differences between the physical processing of the two bits. The bit that programs begins to program a short duration in time ahead of the bit that does not program, or it programs at a different rate, with a steeper slope on the conductivity vs time graph when compared to the $2^{nd}$ bit that did not program.

The PUF latch circuit provides rapid detection of the beginning of programming of the OTP bit first responding and the subsequent active inhibiting of the alternate OTP bit. The PUF-LATCH actively promotes the programming of a $1^{st}$ OTP bit-cell, and actively inhibits the programming of a $2^{nd}$ OTP bit-cell when both bit-cells are given an equal chance to program, and the $1^{st}$ bit-cell demonstrates a 'stronger' programming action. 'Stronger' refers to a steeper slope or earlier phase in the conductivity vs time path. Of the two OTP bits connected to the latch, it is random as to which of the two bits actually programs when many such identical latches and OTP bit pairs are compared.

When the OTP bit changes state from not-programmed to programmed, the oxide in the OTP transistor is broken down so that it changes from a non-conducting oxide to a conducting oxide. The conductivity referred to is between the gate and channel of the OTP transistor. The changing of state takes time. If the conductivity of the oxide were to be monitored at each point in time during the change of state, it is found that even though the initial state for each OTP bit is similar, the final state will have a range of conductivity, and the programming rate or path to the final conducting state will have variation. The PUF latch circuit is sensitive to these variations.

To achieve the above-mentioned sensitivity, this PUF LATCH design has very fast feedback. Once the start of programming is detected on one of the two OTP bits, the alternate bit is rapidly inhibited. This assists to prevent the alternate bit from being significantly disturbed.

The PUF latch will strongly program the $1^{st}$ mentioned responding OTP bit to a permanent strongly programmed state with high conductivity but leave the $2^{nd}$ OTP bit in a low conductivity state.

The OTP bits may be programmed with various programming algorithms. In some embodiments, a program flow first goes through a period of 'soft' or current-limited programming (for example a 2.5 uA current limit may be used) followed by a 'hard' OTP programming (for example a 200 uA current limit may be used) specifically for the bit that first responded to the soft programming. The internal latch mechanism senses which is the stronger programming bit and holds this 'data' for finalizing the programming, during the 'hard' program part of the flow.

In some embodiments, many OTP bit-cells are being used. For example, in an implementation with 512b random bits being generated, 1024 OTP bit-cells are required (two per random digital bit). These OTP bit cells may be grouped on to a common gate connection known as a Wordline. If all the bit-cells on this wordline are for PUF use, it may be referred to as a PUF wordline. After the programming, the latch holds the random data that was programmed to the OTP bit cells on the PUF Wordline (WL). If desired, this latched data can also be used to directly re-program the same random data to OTP bit-cells on a 2nd PUF WL where the programmed '1' or un-programmed '0' state has a margined and guaranteed quality, determined by using a standard (non PUF) OTP programming algorithm.

In some embodiments, a PUF architecture is based on the OTP PUF latch whereby a much larger number of OTP PUF bits is randomly generated, such as 32 Kb of random data. In this description it is referred to as a 'Stand Alone' PUF architecture. This structure may be used for an application where a large number of random bits is required, or this structure may also be used during development of the design to prove the randomness of the generated PUF words.

In some embodiments, sometime after programming, using the latch to read out which of the two bits is programmed is possible by using an internal 1.5 uA current limited load device as a sensing element within the latch block. Current in the pair of OTP bits is compared by the latch and the latch switches to a state which is the same as when the programming flow just completed. This sensing capability of the latch can re-capture the state of the OTP bit-cells at a later time after programming is finished, by executing a latch 'Read' mode. This mode is useful for the Stand-Alone architecture.

For the Stand-Alone architecture, the PUF latch output uses a tri-state driver so that a vertical stack of PUF latches may share a common read-out bit-line. A common read-out Bit-Line (BL-OUT) (and its complement, BLB-OUT) is used throughout multiple vertical stacked latches, where only one latch drives BL-OUT and BLB-OUT at any one time. This simplifies the data path for the large quantity of latches.

In some embodiments, the OTP latch design can connect directly to the edge of an existing OTP memory array that has been designed specifically for security. Such secure memory has features that make it least possible to obtain the memory content through physical reverse engineering or other electrical 'hacking' method. Due to the latch always outputting both a '1' and '0' complementary bits, this PUF architecture is easily connected with existing memory architectures known to be resistant to such outside attack, which also use complementary bit techniques. In this description it is referred to as 'Integrated' architecture. For the Integrated architecture, typically 512b or 1024b PUF bits may be generated.

In some embodiments, the OTP bit-cells used for the purposes of generating the PUF random digital bits are standard OTP bit-cells with identical physical structure and electrical specification as the OTP bit cells used for storing customer specific data or code. This means that the PUF-latch does not require a newly designed OTP bit cell different to the standard OTP bit-cell already available in OTP products.

Some previous methods of using OTP bit-cells for generating random data use a concept where the wordline voltage during programming is required to fall when one OTP bit begins to program, thus limiting the electric field on nearby OTP bits, for the purpose of lowering the rate of program on these nearby bits. This method is less effective because the wordline generally has high capacitance and the time required to decrease the voltage is long, causing the nearby bits to be disturbed. In the PUF latch discussed herein, the wordline voltage used on the OTP bit-cell (e.g. WP1) during programming is not required to fall but can be maintained at a fixed value. The PUF Latch ensures that the non-programming bits are minimally disturbed.

In some embodiments, due to the mechanism of using the PUF-latch function to program one bit-cell and inhibit program function to the alternate bit-cell, the result is that always one bit is programmed and the other bit is not programmed. This is in contrast to previous OTP PUF programming schemes where often both bits of the pair get programmed, due to inadequate control of the non-programming bit, leaving the bit pair useless for random data needs. The PUF latch method discussed herein can ensure that all bit pairs will contribute to the random bit word, maintaining a higher quality of randomness.

The discussion herein regarding the Stand-Alone architecture may be applicable to the secure Integrated architecture, and vice versa.

Figure 1A:
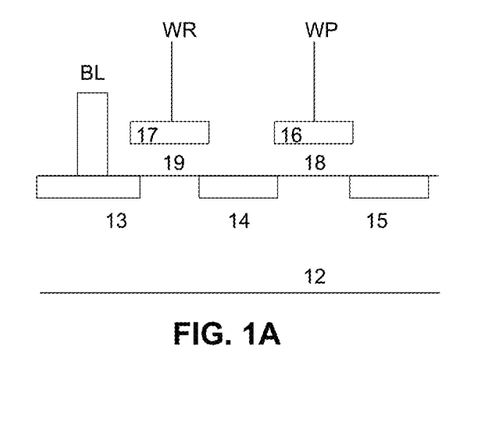

FIG. 1A shows an example of a generalized two-transistor OTP memory cell in a cross-sectional side view. The memory cell has a pass MOSFET (Metal-Oxide-Semiconductor Field Effect Transistor) and a programmable element in the form of a second (MOSFET) transistor. The pass or select transistor is formed by a gate electrode 17 slightly removed from and spanning two N+ source/drain regions 13 and 14 located in a semiconductor body 12 of P-conductivity. Gate electrodes, such as the electrode 17, can be formed by many different conductive materials including, e.g., doped polysilicon, metals (such as tungsten and tantalum), alloys of metal and silicon (either poly or single crystal), and other materials and combinations of materials, which are well known in the semiconductor processing field. A thin insulating oxide layer 19, called a gate oxide, separates the body 12 and N+ regions 13 and 14 from the gate electrode 17 which is part of a read word line WR. The two source/drain regions 13 and 14 and the gate electrode 17 define a channel region on the top of the body 12 for the pass transistor. The N+ source/drain 13 is connected to a bit line BL and the N+ source/drain 14 forms the source/drain of a second MOSFET transistor, the programmable element. A second N+ source/drain 15 which is electrically floating, is part of the second MOSFET transistor which has a gate electrode 16 slightly removed from and spanning the two N+ source/drain 14 and 15. The gate electrode 16 is part of the programming word line WP. A thin insulating gate oxide layer 18 separates the body 12 and N+ regions 14 and 15 from the gate electrode 16. The two source/drain regions 14 and 15 and the gate electrode 16 define a channel region on the top of the body 12 for the programmable element.

Further details regarding two-transistor OTP memory cell structures are discussed in U.S. Pat. Nos. 7,471,540 and 7,623,368, each incorporated by reference in their entirety.

Figure 1B:
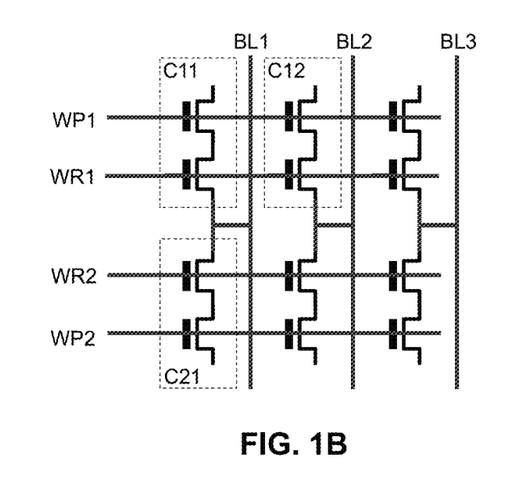
FIG. 1B shows a small part of a generalized OTP memory array, in accordance with some embodiments.

FIG. 1B shows an exemplary array of OTP memory cells which is part of a larger array of cells and is used to explain the programming of the memory cells in an array. Six memory cells are shown in the array with three vertical bit lines, BL1-BL3, and two pairs of horizontal word lines, read word lines WR1-WR2 and programming word lines WP1-WP2. It should be noted that "vertical" and "horizontal" refer to the drawing directions to better explain the memory cell array. Each OTP memory cell has the gate electrode of its pass transistor connected to a WR line and the gate electrode of its programming element transistor connected to a WP line. Pairs of memory cells are connected in common to the bit lines. Hence memory cells C11 and C21 are connected in common to bit line BL1. As described above, one source/drain of the programming element transistor is left floating and shown without a connection. The other source/drain is also a source/drain of the memory cell's pass transistor.

The present invention provides for a PUF implementation using OTP bit cells as the source of randomness. Connected to two OTP memory cells, a latch circuit relies upon the random variation of the OTP memory cells to generate a bit which is part of a larger random bit pattern. The random bit pattern, typically 256 bits or larger, can be used as a unique die signature, or as an input seed to a random number generator, or other function to enhance secure access.

In program mode, only one of the two OTP memory cells to which a latch is connected is programmed. That determines whether the latch holds a "1" or "0" bit. The two OTP bits which are connected to a common latch are typically located on the same WP/WR line. Usually they are in close proximity so that the WP/WR voltages experienced by both bit-cells is the same at any point in time. An example of two such bits is seen in FIG. 1B. They are bits C11 and C12. In this example the BL1 and BL2 bit lines will connect the bits C11 and C12 to a nearby OTP-PUF-latch. The latch circuit responds to the quickest programming bit-cell of the two OTP memory bit-cells, based on minor random physical differences between the physical processing of the two cells. The quicker cell begins to program a short duration in time ahead of the second cell that does not program. The programming of the first bit in the quicker cell is rapidly detected and the programming of the bit in the second cell is actively inhibited. In the rare case that both cells follow an identical path, through time, to the final programmed state, the bit-cell with the highest conductivity final state dominates the direction of the final state of the latch.

There are two programming methods or programming flows to program one of the pair of OTP memory cells and set the latch state to the randomly programmed bit accordingly. The first program method uses a program flow that first goes through a period of 'soft' or current-limited programming (for example using a 2.5 uA current limit) directly followed by a 'hard' OTP programming (for example using a 200 uA current limit) specifically for the bit that first responded to the soft programming. At the end of the soft programming part of the flow, the latch circuit has sensed which OTP bit-cell is the stronger bit and holds this 'data' for finalizing the programming, using the hard program flow.

During programming, the latch has a choice of current load device connected in series with the OTP bit-cell. In the case the current is limited to a low value (e.g. 2.5 uA), the degree of programming is limited to a low conductivity value. This is used in 'soft' program because it moderates the time for the OTP bits to respond to the programming voltage stresses and leaves more time for the latch to respond. Once the stronger bit has been established under soft programming conditions, rapidly switching the program load device to a higher current (e.g. 200 uA) will finalize the programming of the stronger OTP bit-cell.

Additionally, it should be noted that when the programming mode is entered, the wordline WP is raised up to a voltage which is high enough to break-down the oxide of the OTP device connected to that WP. However, the mentioned current load is inside the latch which is connected to the BL (e.g. BL1 and BL2 in FIG. 1B). This load device current limit influences the rate of programming of the OTP. The latch provides two identical current loads. Thus each of the two OTP's connected to the latch have substantially identical current loads.

Also note that during programming the wordline WR is connected to a high enough voltage such that the current that flows through the OTP oxide after breakdown can be conducted through the selection device and on to the program path loads inside the latch.

After the programming is complete, the PUF latch holds the 'data' representing which of the two PUF OTP bits-cells was programmed.

In the second flow, the soft program mode is skipped and the flow goes directly to 'hard' programming. After programming, as per the first flow, the PUF latch holds the 'data' representing which of the two PUF OTP bits-cells was programmed. Deciding which flow is preferred may be determined empirically when testing the PUF product silicon module.

As an option, the 'data' stored in the PUF latch after programming may be used directly to re-program that same random data to OTP bit-cells on a $2^{nd}$ PUF WL. The reason to do that is the programmed '1' or un-programmed '0' state on the $2^{nd}$ WL would have a margined and guaranteed quality, determined by using a standard (non PUF) OTP programming algorithm. In particular, the '0' or unprogrammed OTP oxide would have experienced a lower disturb, less than the '0' bit on the original $1^{st}$ PUF WL. This can be useful for qualifying the device reliability over a long product lifetime.

Once programming is completed, the latch may be used as a reading element to determine which of the two OTP bits was programmed. This is particularly useful in the case of the 'Stand-Alone' architecture. Reading out the programmed bit uses an internal 1.5 uA load device as a sensing element within the latch block and captures the 'data' in the internal latch. This data may be routed out of the PUF block to external logic for acting on the data value. When using the reading mode, the WP wordline is connected to a relatively low drive voltage, (e.g. 1.2V) which does not influence the state of the oxide in the OTP bit-cells. This 1.2V source provides a small current through the OTP bit-cell which has the conducting oxide. Additionally, the WR wordline is connected to a voltage similar to the logic VDD power supply. This read method may not be required in the case of the 'Integrated' architecture implementation, where the PUF latch is integrated to an existing memory array designed for high security. In this case the existing sense amplifier used to read the state of the existing OTP memory bits can be used instead.

Figure 2A:
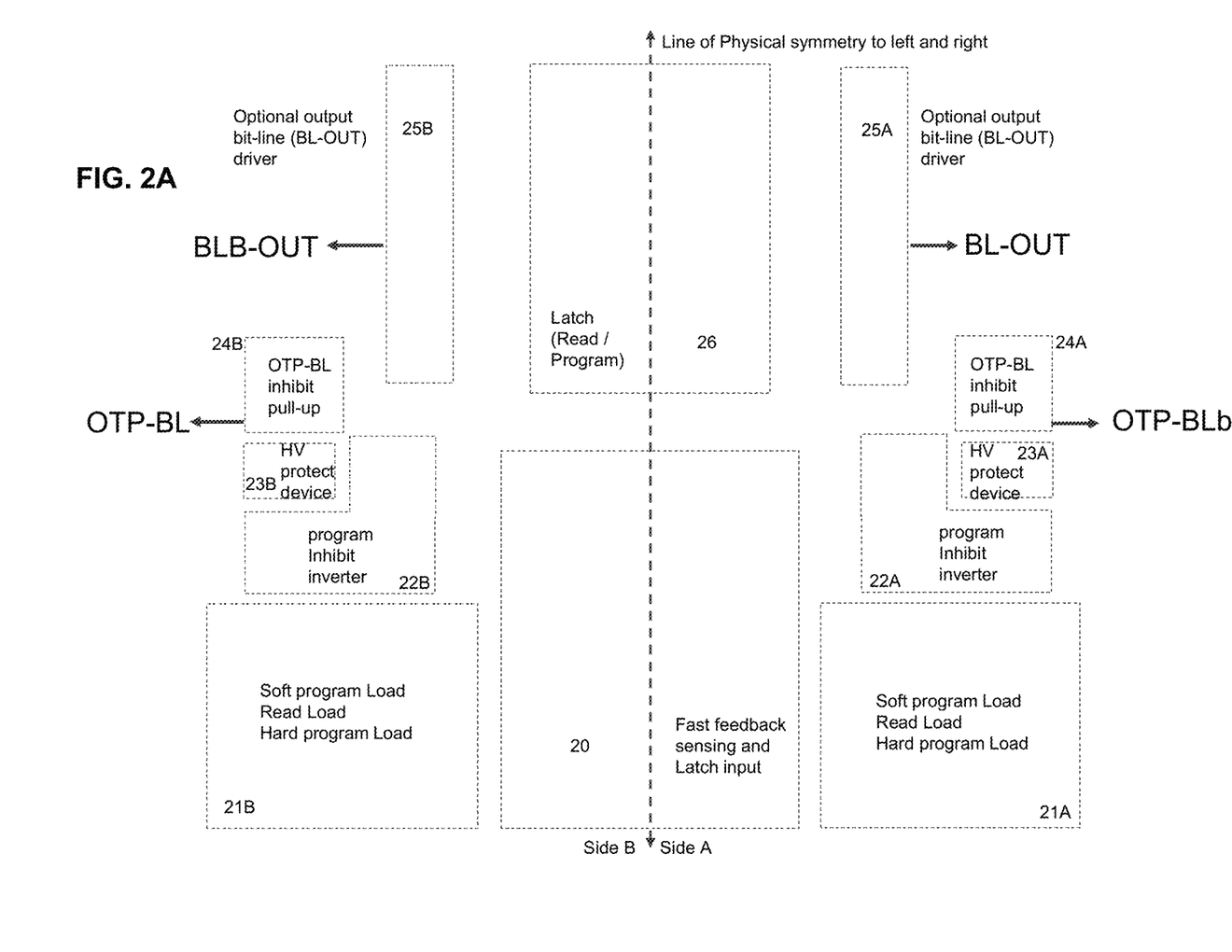
FIG. 2A is an overview of the components of the OTP-PUF latch, in accordance with some embodiments.
Figure 2B:
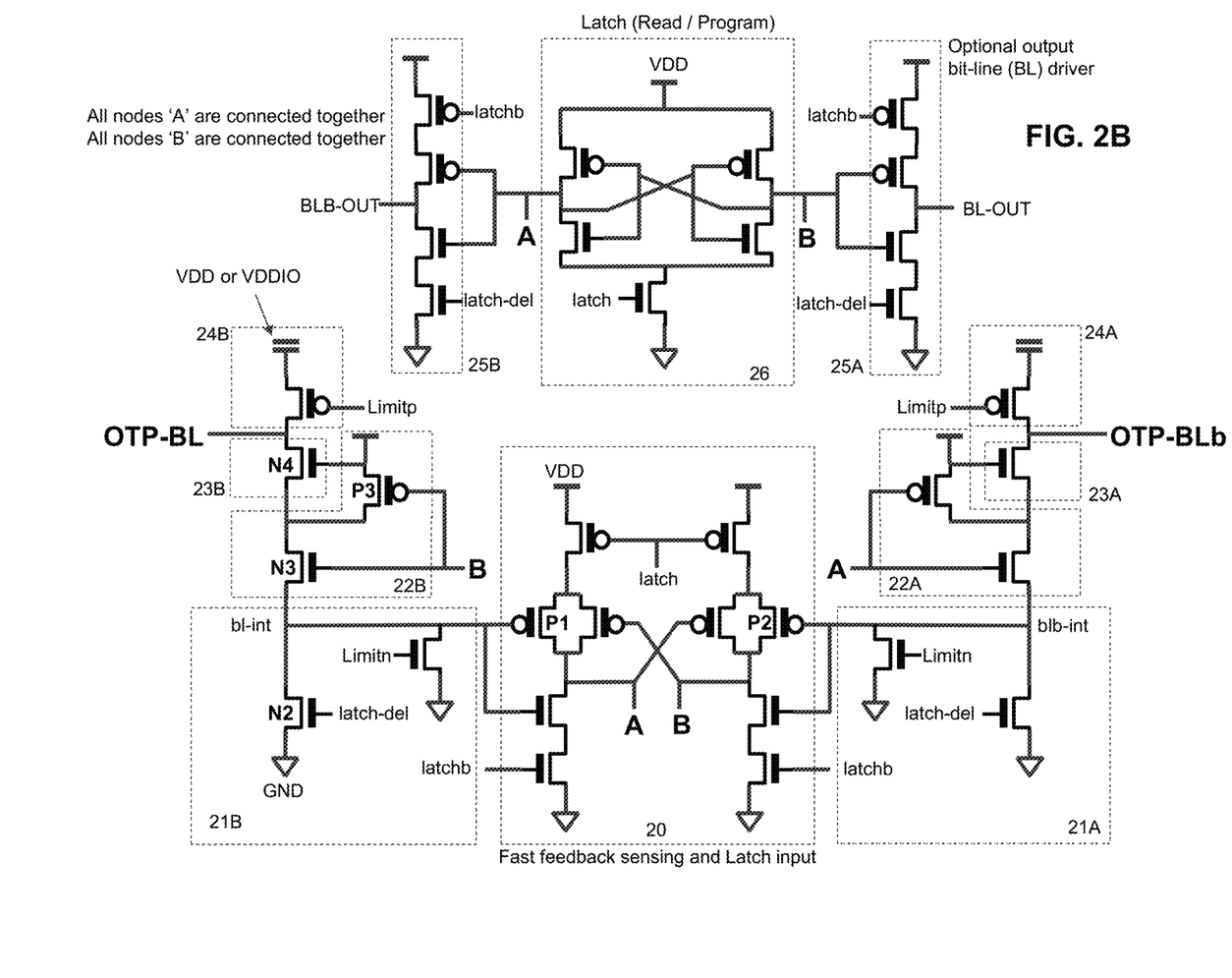
FIG. 2B shows the details of the OTP-PUF latch transistor circuit, in accordance with some embodiments.

FIGS. 2A and 2B show the architecture of a latch circuit, in accordance with some embodiments. With reference to FIG. 2A it should be noted that the circuit is symmetrically arranged, both electrically and physically, to avoid biasing the programming of the two connected OTP memory bit-cells toward either one cell or the other. That is, side A and side B are a mirror of each other. When creating the physical layout, care is taken to be sure all transistors on each side of the latch are physically matched as per standard analog design rules provided by most semiconductor manufacturing foundries. Also, the resistance and capacitance of interconnects are matched on each side of the latch.

Each OTP Latch contains the following circuits and functions (refer to FIG. 2A):

a. Blocks 21A and 21B. Soft program/Read current limit load device:
   i. Current limited load device used during soft programming. The device forms part of a current mirror whose current drive is set-up in a current mirror circuit outside the latch block. The current mirror outside the block drives multiple latches. During soft programming, this load device limits current to approximately 2.5 uA. This load device also serves as the load device during read mode where the outside current mirror driver is switched to a lower current (e.g. 1.5 uA) during read mode.
b. Blocks 21A and 21B. Hard program current limit load device.
   i. This additional load device is enabled during hard programming of the quicker bit, to finalize the programmed state.
c. Block 20. Fast feedback sensing and latch input. The block 20 is also referred to as a pre-latch and sense circuit 20, or pre-latch 20.
   i. This is a sensing 'pre-latch' which samples the analog voltage on the program or read load device drain terminal. A higher voltage on side A or B will cause the pre-latch to drive a digital '1' or '0' to the inverter (block 22A/B) that controls the programming current in the OTP device. This function is designed to operate at high speed so that the non-programming bit is minimally disturbed.
d. Blocks 22A and 22B. Program inhibit inverter. Blocks 22A and 22B are also referred to as inverters 22A and 22B.
   i. This inverter takes the '1' or '0' output from the pre-latch, at its input. If the input is '1' the inverter allows program current to flow through the OTP bit. If it is '0' the programming current is shut off to the OTP bit. Initially, at the start of programming, both inverters (side A and side B) have a '1' at the inverter input, allowing possible current to both OTP bit cells. Once one of the two OTP's begins to program, the alternate bit is rapidly inhibited by switching the inverter input to '0'.
e. Blocks 23A and 23B. High voltage (HV) protection device.
   i. This is a single device each side. This device is a 'buffer' transistor to protect the thin oxide load devices from seeing voltage higher than logic VDD. During programming, when an OTP device becomes program-inhibited due to it being the slower OTP, its bit-line BL (e.g. BL1 or BL2 in FIG. 1B, otherwise OTP-BL or OTP-BLb in FIG. 2A), voltage is raised up to a higher potential than the logic VDD value. This value may be VDDIO (the voltage used to drive thick-oxide devices) allowed in many processes. The latch is composed of thin oxide devices driven by the VDD supply. This buffer device has a thick oxide and is configured to prevent the VDDIO voltage from being seen on the thin oxide pre-latch and load transistors.
f. Blocks 24A and 24B. Bit-line inhibit pull-up. Blocks 24A and 24B are also referred to as pull-up devices 24A and 24B.
   i. This is a single device each side. During programming, when an OTP bit-cell becomes program-inhibited due to it being the slower OTP, its bit-line BL (e.g. BL1 or BL2 in FIG. 1B, otherwise OTP-BL or OTP-BLb in FIG. 2A), voltage is raised up to a higher potential than the logic VDD value. This device is responsible to pull up the BL voltage to a value such as VDDIO. On the side of the latch where the OTP is inhibited, this device pulls up the capacitance of the BL to VDDIO and prevents additional programming. However, on the other side of the latch where programming is in progress, this device does leak some small current through the programming load. For that reason, the gate of this transistor is set at an analog voltage driven by an external current mirror which significantly limits the current through this pull-up device to the program load. This mentioned leakage is thus not a concern.
g. Blocks 25A and 25B. Optional output-bit-line (BL-OUT) driver. Blocks 25A and 25B are also referred to as output drivers 25A and 25B.
   i. This is a simple tri-state digital driver to output the PUF-latch data content to external circuitry. In the case where many PUF-latches are stacked vertically, the signal BL-OUT and its complement BLB-OUT are shared vertically. Only one latch drives the BL-OUT and BLB-OUT lines at any time. The other latches, not driving, are in tri-state mode. This method simplifies getting the data output from a large quantity of latches. However, the latches will be read in sequence by the external logic (not shown).
h. Block 26. Latch for Read and Program. Block 26 is also referred to as main latch 26.
   i. This is a latch whose input is connected to the output of the sensing pre-latch 20. This is the latch where the '1' or '0' data is stored reflecting which of the two OTP bits actually programmed. The output of this latch drives the input to blocks 25A and 25B.

FIG. 2B shows the internal detail of the PUF Latch. This will be described in detail after first introducing the context of the Stand-Alone architecture. This is one example of how to configure a Stand-Alone PUF module using a set of OTP PUF latches and OTP bit-cells described. Many other variations are possible but the underlying building blocks are the same.

Figure 3:
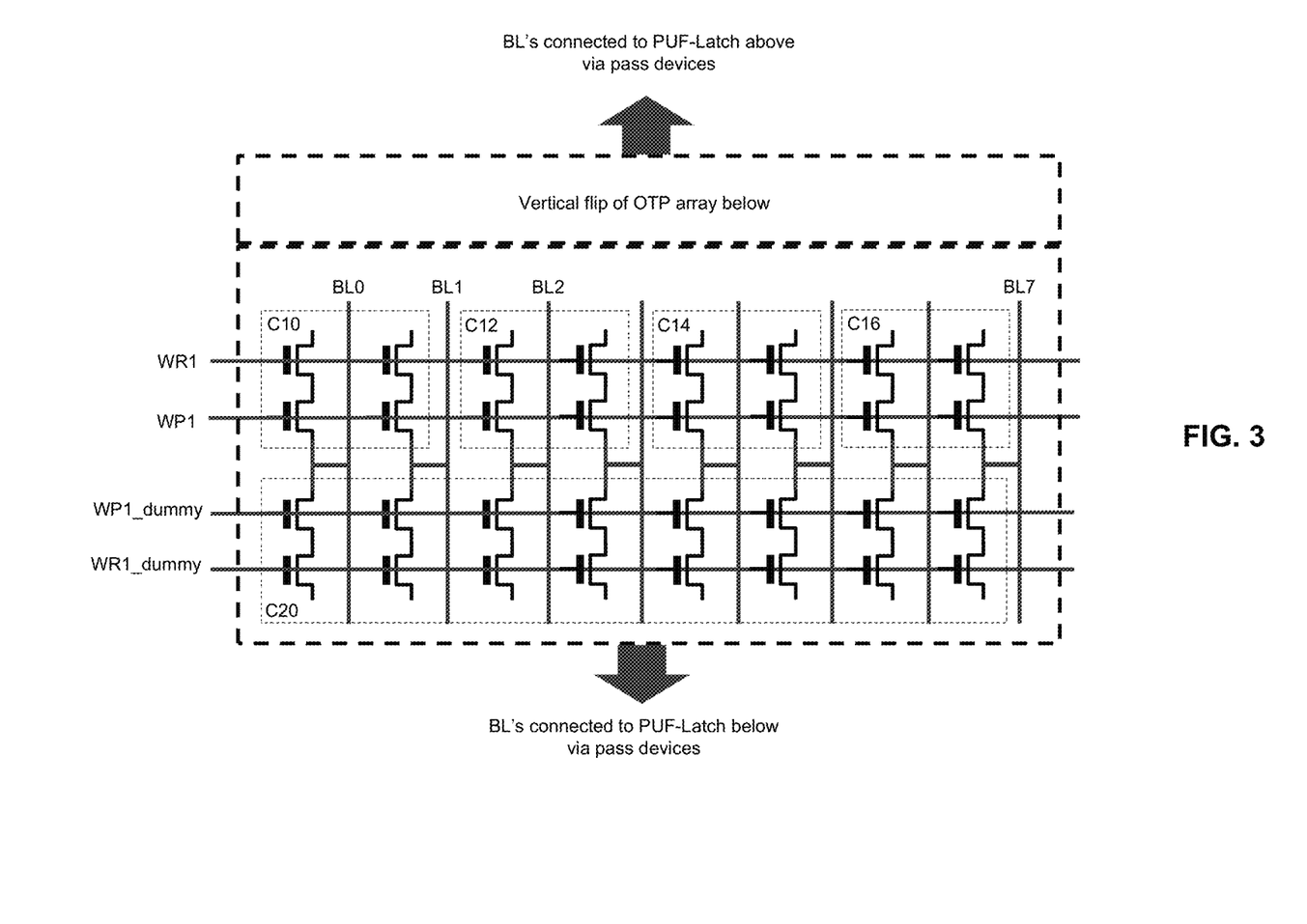
FIG. 3 Details a section of OTP memory bit-cells suitable to be interfaced to an accompanying OTP-PUF latch circuit, in accordance with some embodiments.

First, referring to FIG. 3, sixteen OTP bit-cells have been arranged in two rows of eight bit-cells. One row is an active row and the second row is a dummy row. 'Dummy' means that these cells are not programmed but are present to give lithographic uniformity when the bit-cells are manufactured. The dummy row wordlines are labeled WP1 dummy and WR1_dummy and are usually connected to ground or 0V potential. The active OTP bits on row WP1/WR1 are in four groups of two cells, C10, C12, C14, C16. The pair of BL (e.g. BL0 and BL1 for group C10) are ultimately connected through to the PUF Latch OTP-BL and OTP-BLb inputs. However, due to the fact that there are four pairs of OTP, selection devices are placed between the OTP BL (e.g. BL0 and BL1) and the latch, such that only one pair of the four pairs of OTP is connected to the latch at any time. Notice too in FIG. 3 that the groups of OTP drawn are repeated vertically so that the lower group connects to a latch below and the upper group (not detailed) connects to a latch above.

Figure 4:
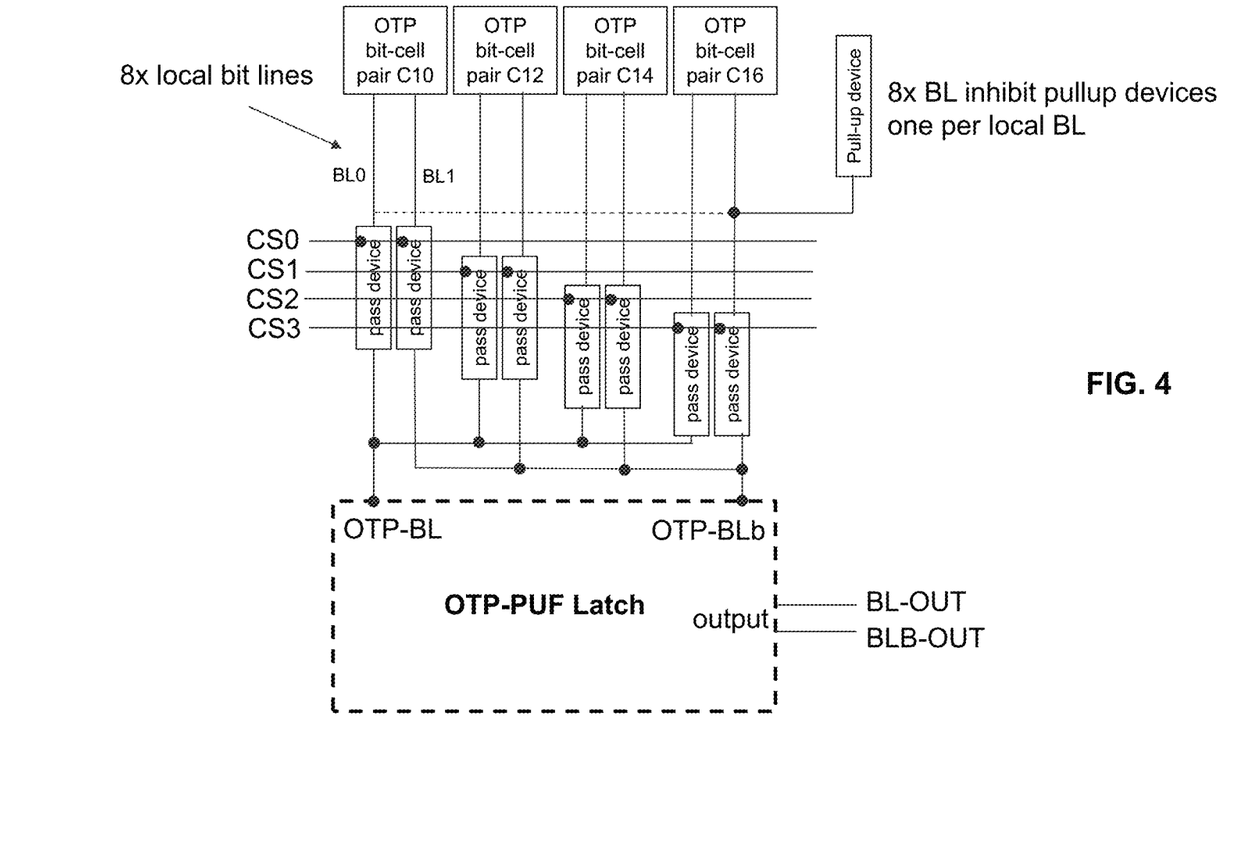
FIG. 4 details the method of connecting one OTP-PUF latch to four pairs of OTP bit-cells using a Column Selection (CS) decoder, in accordance with some embodiments.

Referring to FIG. 4, the four pairs of OTP bits are shown (C10, C12, C14, C16) and a representation of the bit-line pass device is shown. This pass device is usually an n-channel MOSFET. The gate of the MOSFET is driven by decoded signals CS0, CS1, CS2, CS3 as shown in the diagram. The pass devices are enabled in pairs. Only one pair is enabled (conductive) at any time and the other three pairs are disabled. That is achieved by having only one of CS0, CS1, CS2, or CS3 at a digital '1' state at any time and the other three are at '0' state.

Referring to FIG. 4, the local bit line between the pass device and the OTP (e.g. BL0 and BL1) may utilize a local pull-up device, which is usually a weak p-channel MOSFET, to bring the unselected local bit-lines to a higher voltage, which is necessary to reduce disturbing unselected OTP bits on the WP1/WR1 row. This is a standard practice in OTP memory arrays. In FIG. 4, one each of the pair of pass devices is also connected to one side of the PUF latch input (e.g. OTP-BL) and one each of the alternate pass device pair is connected to the alternate PUF latch input (e.g. OTP-BLb). Using this method, one PUF latch can service four pairs of OTP-PUF bits, which saves space vs having one latch for each OTP pair. However, it can be seen that the CS decoder can be removed and an architecture is possible where one latch services only one pair of OTP-PUF bits.

Figure 5:
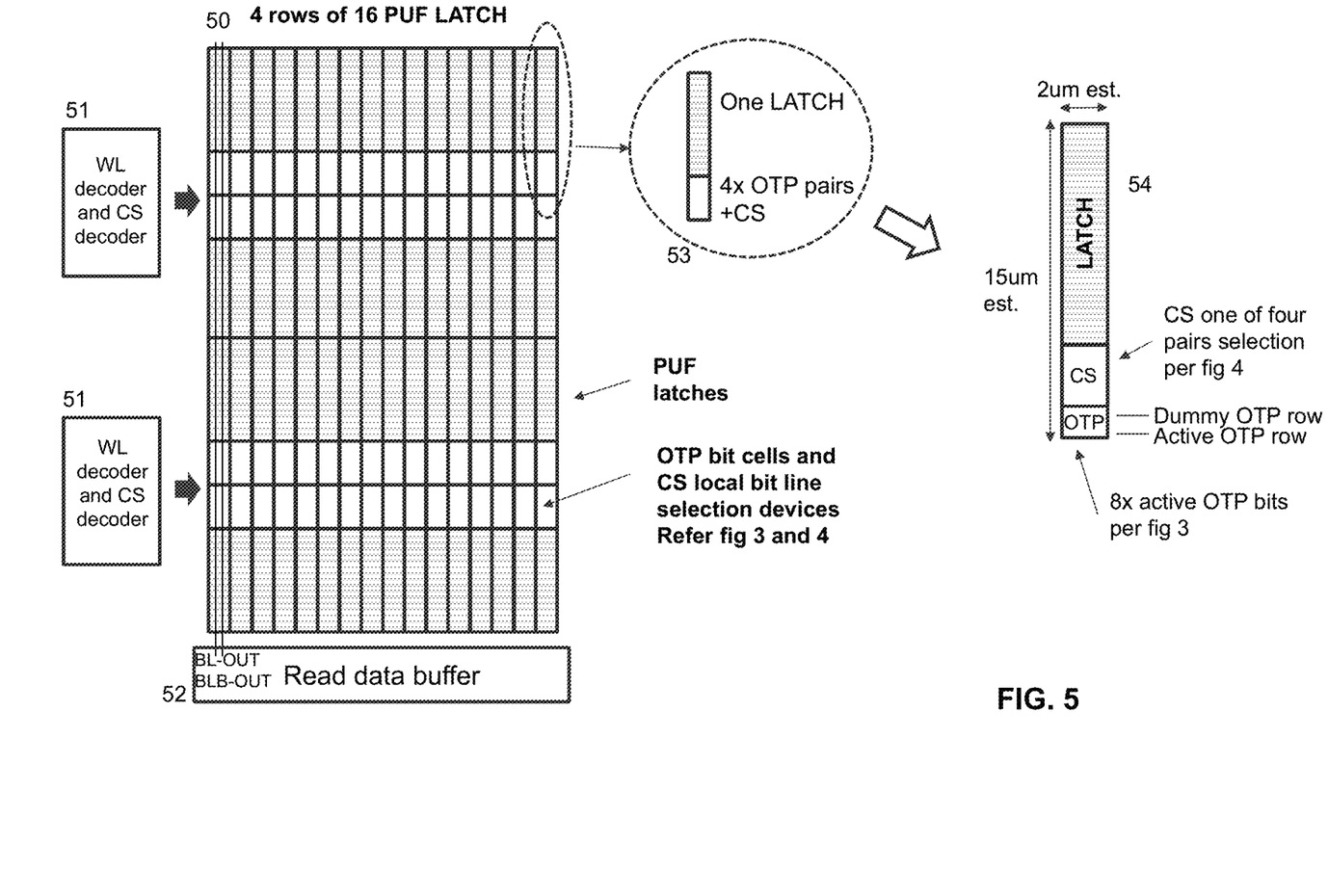
FIG. 5 shows an example 'Stand-Alone' architecture of a set of OTP-PUF latches and accompanying OTP bit-cells for generating 256 random digital PUF bits, in accordance with some embodiments.

Referring to FIG. 5, the diagram shows how the above described components can be assembled into a module 50 which contains 256 PUF bits using 512 OTP bits. Group 54 shows how the latch is physically arranged relative to the 8 OTP bit cells wide row shown in FIG. 3. The latch width is drawn to be the same width as the 8 OTP bit-cells. The CS pass devices are between the OTP and the latch. In one embodiment of this design the physical size was approximately 2 um wide and 15 um tall. The items in group 54 are arrayed out into a row of sixteen latches. That row is also arrayed vertically into for vertical rows, for a total of 64 latches for the module 50. Notice that, in the vertical direction, the OTP bit-cell part of the rows are abutted so that each set of OTP are adjacent (vertically and horizontally). Each of the 64 latches services four pairs of OTP bits (or four PUF bits) for a total of 256 PUF bits. The architecture can be easily extended or reduced based on the number of PUF bits desired.

It should be pointed out that the PUF latch has been specifically designed so that the latches can be arranged in the manner shown, where each latch in a row shares the same digital and analog control signals along the row. Using that method, the latch layout is designed such that each latch can be abutted to the adjacent latch and the necessary control signals are automatically connected through from the adjacent latch. This also applies to the layout of the OTP row and the CS row. In FIG. 5, driver 51 is an example of a common driver that outputs signals along the row of PUF latches and OTP bits. The driver 51 outputs the CS0, CS1, CS2, CS3 signals and also WP1/WR1 signals for each row. Not shown is a digital logic driver that services the digital inputs to each row of latches, and also an analog driver containing the necessary current mirrors to control the current limit loads in the latches. One driver set is used for each row of latches, however, a single set could be used to drive all rows of latches.

Logic block 52 reads out the data from the latches. Shown in FIG. 5 is an example of the BL-OUT and BLB-OUT output data lines driven from the tri-state output driver of each latch. These two lines connect to the appropriate outputs of all the latches in the vertical stack. Only one latch of the four in the stack drive these lines at any time. These connect to the logic block 52 which is designed to sample the output from each vertical stack of latches in sequence so that the content of all the latches can be obtained. This completes the detailed discussion of the Stand-Alone architecture.

Returning to FIG. 2B, the specific functions of the various groups of transistors have already been described. Concerning the various control signals: 'limitp' and 'limitn' are analog inputs from an external current-mirror (not shown) to limit the current in each of the load devices. Example, Limitp voltage limits the current in blocks 24A and 24B, and Limitn limits the current in those devices with gate tied to Limitn. Signals 'latch' and 'latchb' are a direct logical complement of each other. When 'latch' is at logical '0', the pre-latch and sense circuit 20 is active and the main latch 26 is off. When 'latch' goes to '1', the information held in the pre-latch 20 is transferred to the main latch 26. Signal 'latch-del' follows 'latch' signal but is slightly delayed from 'latch' by e.g. 1 ns to 2 ns. The delay is used to ensure that the information in the pre-latch 20 is passed to the main latch 26 before the nodes 'bl-int' and 'blb-int' are disturbed by enabling the hard program load (example device N2), at which time the information on 'bl-int' and 'blb-int' is lost.

Figure 6:
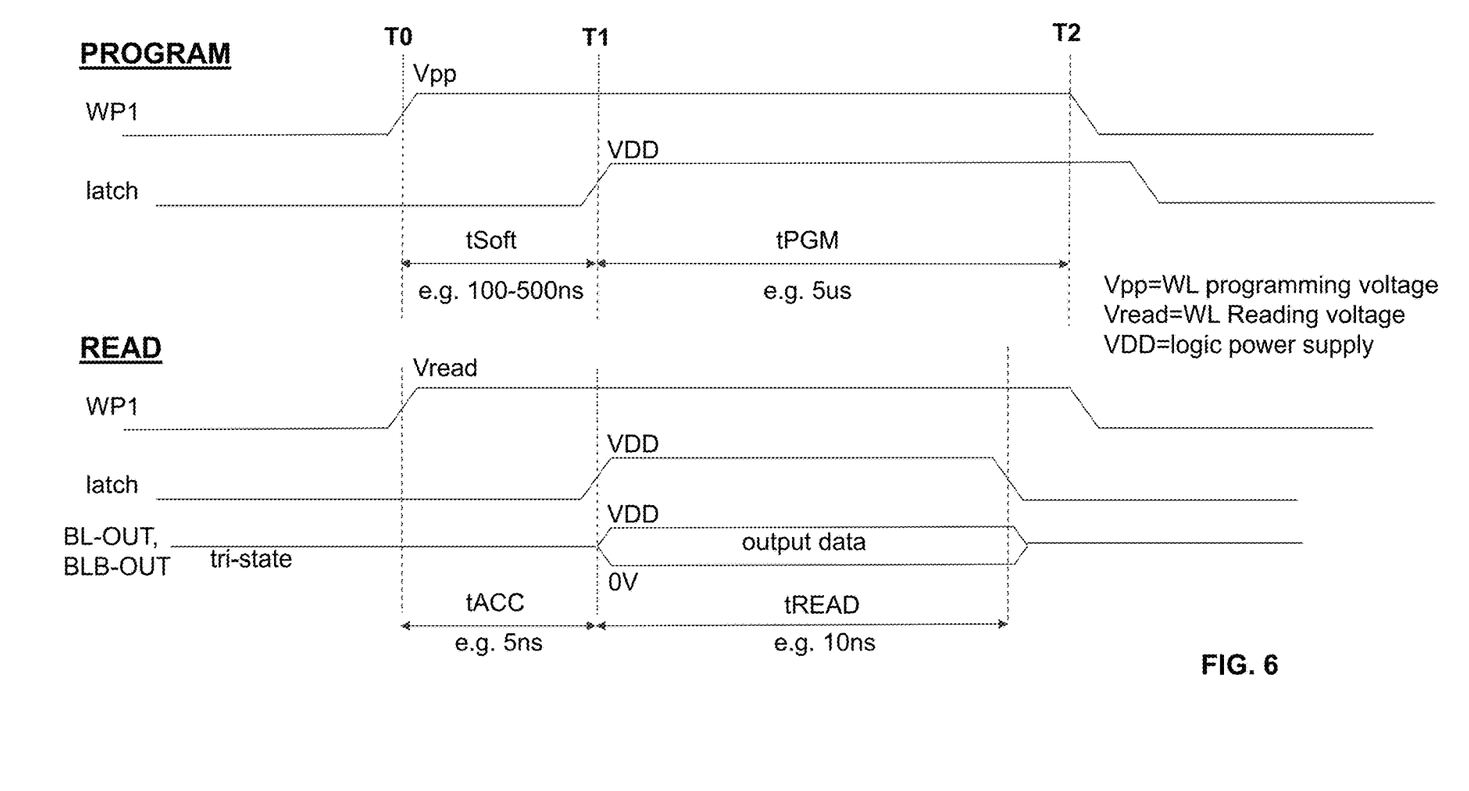
FIG. 6 is a timing diagram for programming and reading OTP bit-cells via the PUF latch, in accordance with some embodiments.

The operation of the OTP-PUF latch (FIG. 2B) is better understood while also referring to timing diagram FIG. 6. This is a simplified timing diagram showing key features only. The specific details of how the control signals are generated to drive the latch are not specified in this text. At time T0 the OTP wordline WP1 is driven to a high voltage (Vpp) such that it is high enough to break-down the OTP oxide. Vpp is usually about 4V to 4.5V, depending on which specific manufacturing process is used. The signal 'latch' is held low until time T1. During the time T0 to T1, the pair of OTP bit-cells connected to the latch are undergoing a 'soft' programming, as previously explained. Also at this time WR1 is at approximately VDDIO. Inside the latch (FIG. 2B) the nodes bl-int and blb-int are initiated at 0V and both nodes A and B are at a logical '1' due to the pull-up of devices P1 and P2. With A and B at '1' state, the inverters 22A and 22B are both 'on' allowing current to pass from the OTP bit line (e.g. BL1 and BL2) through device (example N3) in the inverter P3/N3. In this state, both OTP devices in the accessed pair see identical soft program voltage conditions. When one of the OTP devices begins to take current due to its oxide beginning to become conductive, the OTP current flows through load device with gate tied to Limitn. The voltage at either node bl-int or blb-int will begin to rise as the current increases. Depending on which of these two voltages is higher, the pre-latch 20 will force either node A or node B to a low state. Feedback is applied to the inverters 22A and 22B. For example, if blb-int is higher than bl-int, node B will go lower ahead of node A, inverter 22B goes to an off state (i.e. N3 not conducting), restricting current flow from the OTP device attached to the OTP-BL, thus further lowering bl-int. In that condition, pull-up device 24B will further inhibit programming on the OTP device connected to OTP-BL by raising OTP-BL to VDDIO (for example 1.8V or 2.5V). This lowers the electric field at that OTP device. However, node A will be re-enforced to its higher state as P1 turns strongly on. Inverter 22A will remain on, allowing the OTP on OTP-BLb to continue soft programming, further raising the node voltage at blb-int. Note that the inhibit state of the OTP on OTP-BL is achieved very quickly once the alternate OTP begins to conduct, due to fast response of the pre-latch. The feedback may complete in less than 1-2 ns. The inhibiting pull-up of OTP-BL by the pull-up device 24B is fast due the capacitance of OTP-BL being substantially low. It is low capacitance because this connection travels only a short distance from the latch to the CS pass device and OTP. At the end of soft programming (time T1) in this example, node B will be at 0V and node A will be close to VDD. At time T1, one OTP has begun programming and the other OTP is strongly inhibited from programming. Of course, it should be realized that the opposite case is just as likely (e.g., node A becoming 0V) depending on the random nature of the soft programming of the two OTP bit-cells connected to the latch. In the rare case that both OTP oxides break down in an extremely similar fashion, the pre-latch will still take a state where one side is inhibited and the other programs.

At the end of soft programming (T1) the signal 'latch' is raised to '1' and 'latchb' becomes '0'. At this time main latch 26 is enabled and immediately takes on a state driven by the state of nodes A and B. This state is retained in the main latch 26 until signal 'latch' returns to '0'. Note, 1 ns to 2 ns after 'latch' goes to '1', latch-del goes to '1' also. This enables the hard program loads on both sides of the latch, example device N2. Depending on which inverter 22A or 22B is conducting (due to the latch 26 driving nodes A and B), a large current will begin to flow in the OTP device, through the hard breakdown load device (e.g. N2), causing a hard breakdown of the OTP oxide. Typically, about 200 uA flows in the hard break down load device and about 5 us of time is allowed for this hard breakdown operation, finishing at time T2. At T2, the WP1 OTP wordline voltage is lowered, completing the programming.

After OTP bit-cell pairs have been programmed in the context described in the preceding text, each OTP pair will have one bit strongly programmed and the other bit unprogrammed. The state of the OTP pair can be read using the built-in read mode contained in the latch.

With reference to the timing diagram of FIG. 6 for reading, the WP1 OTP wordline is raised to a level which causes a small current to flow in the OTP bit that is hard programmed. This is typically about 1.2V to 1.3V. In the OTP-PUF latch circuit, the read load devices, those with gate tied to Limitn, are set such that Limitn analog voltage level provided from an external current mirror, limits the current in the loads to about 1.5 uA to 2 uA (however higher or lower current can be used depending on the OTP bit-cell's conductivity range). Depending on which OTP bit-cell of the pair connected to the latch is conducting, bl-int or blb-int voltage will rise up due to current flowing in the read load device. This will cause either node A or B to go to 0V, which in turn forces inverter 22A or 22B (example device N3) to be turned off, which forces the un-programmed OTP to remain in its non-conducting state. A short time from T0 to T1 is allowed for the above described sensing action to complete, with signal 'latch' at '0'. Then at T1, 'latch' is driven to '1' and the state of nodes A and B are transferred to the main latch 26. Note, 1 ns to 2 ns later than T1, output drivers 25A and 25B are enabled by signal latch-del' going from '0' to '1'. At this time the output BL-OUT and BLB-OUT become available to pass the data to external logic. The complementary states of BL-OUT and BLB-OUT represent which of the pair of OTP bits was programmed and is expected to be completely random when many pairs of OTP bit-cells are compared but is fixed (after programming operation) for each individual pair of OTP bit-cells.

It is possible that after the programming sequence of the OTP-PUF bit-cells described above is completed, the bit-cell that was not programmed (the '0' bit) is left in a slightly disturbed state from its native state. This means the '0' PUF bit could have a slightly higher conductivity than the unstressed '0' bit. In that case the '0' PUF bit could be less stable over the lifetime of a product. If this is a concern, after the PUF programming sequence is finished as described above, a further standard program sequence may be executed using the data already stored in the OTP-PUF latch at the end of the PUF program sequence. This standard program sequence typically does not contain the soft program aspect. Vpp is applied to a $2^{nd}$ wordline containing a row of OTP bit cells in parallel to the OTP-PUF bit-cells. These $2^{nd}$ row of bit cells are identical to the row on WP1. They are then programmed immediately after the PUF bit pair are programmed. The advantage is that after programming on the $2^{nd}$ wordline row, the OTP's that are not programmed, or remain '0' bit, retain a relatively undisturbed oxide with high reliability, as per a standard OTP product '0' bit. The random data is then transferred to these OTP bits. In use, the PUF random data would then be read from the $2^{nd}$ OTP wordline bit-cells.

One additional feature may be used in the OTP-PUF latch in the Stand-Alone architecture. During the programming of an OTP-PUF bit on for example WLP1, only one bit at a time is desired to programmed on WP1. This is because the programming action takes approximately 200 uA of current which flows on the WP1 wordline. If substantially more than one bit programs, the current requirement on WP1 may be too high producing excessive voltage drop. For that reason, only one (e.g., of sixteen) OTP-PUF latches is enabled for programming at any time. The other (e.g., 15) latches on the common row are disabled.

Figure 7:
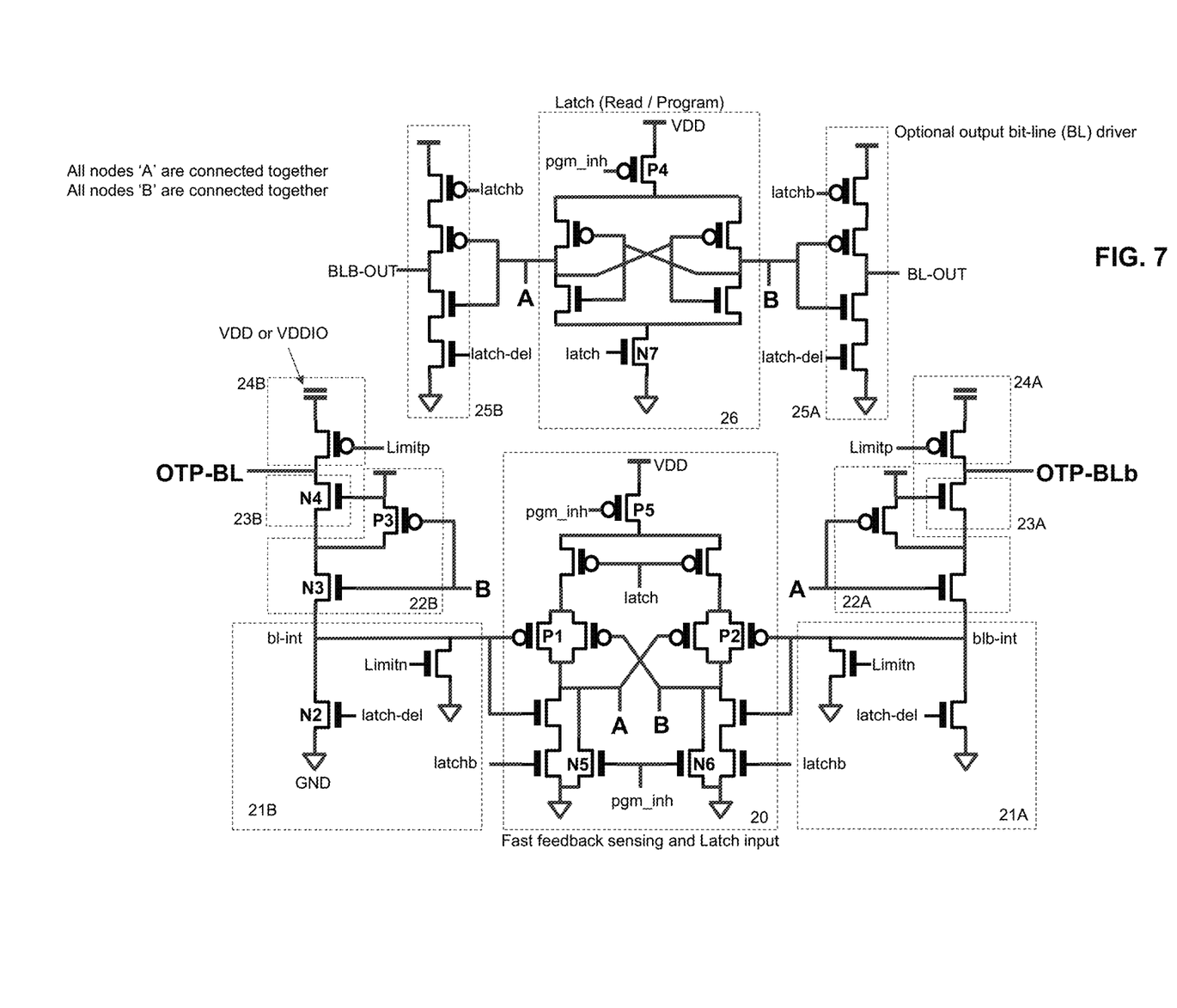
FIG. 7 is a version of the OTP-PUF latch with a latch-inhibit feature used in program mode, in accordance with some embodiments.

FIG. 7 shows how one bit programming is achieved. Four devices are added to the basic latch, N5, N6, P4 and P5. All of the added devices have their gates tied to a signal named 'pgm_inh' (program inhibit). This signal is unique to each latch. When 'pgm_inh' is logic '1' the latch is inhibited from programming. For a row of 16 latches there are 16 separate 'pgm_inh' signals and only 1 of 16 is at logic '0'. The other 15 are at logic '1'. An external decoder generates the needed drive for this signal set. Only the enabled latch will have a programming bit. The other 15 latches will generate program inhibit conditions on both associated OTP-PUF bit-cells. This means that the inhibited bit-cells associated BL voltage is driven to VDDIO.

Figure 8:
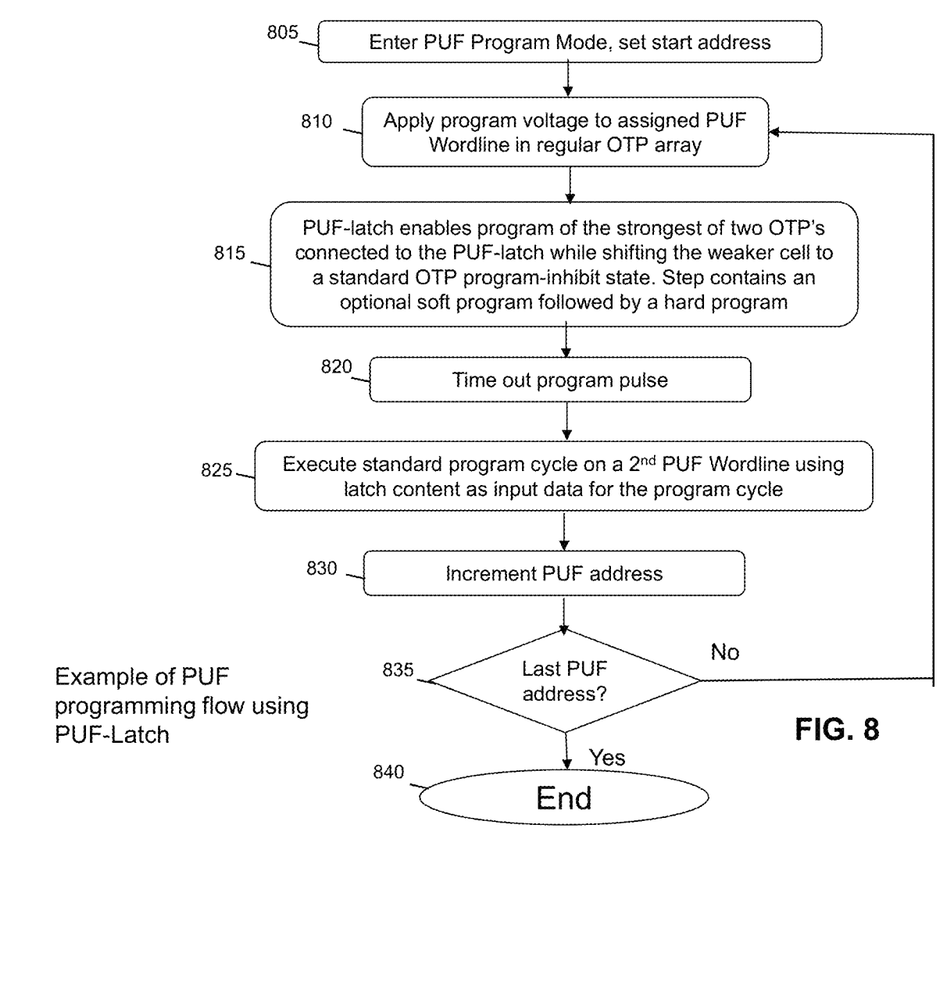
FIG. 8 is a flow chart of a process for programming the PUF bit-cells using the PUF latch, in accordance with some embodiments.

FIG. 8 is a flow chart of a process 800 for a PUF program flow. The process 800 may be performed by a PUF circuit including a first and second OTP memory cells, and a latch circuit connected to the first and second OTP memory cells. The first and second OTP memory cells from a bit-cell pair.

A PUF program mode of the PUF circuit is entered by setting 805 the address of the OTP bit-cell pair to be programmed. This will involve CS selection and the correct WP1 selection and any required PUF latch selection address such as 'pgm_inh' signal mentioned above.

The Vpp is applied 810 to the selected PUF wordline WP1, with the 'latch' signal '0' to execute soft program. Next, the PUF-latch enables 815 programming of the strongest of two OTP bit-cells connected to the PUF-latch while shifting the weaker OTP bit-cell to a standard OTP program-inhibit state. Furthermore, the 'latch' signal may be switched to '1' and thereby holding the data for which bit programmed in the main latch block.

In some embodiments, a soft programming at a lower current level initiated on both the first and second OTP memory cells, and a faster programming OTP memory cell is detected. A hard programming for the faster programming OTP memory cell is performed using a higher current level. Furthermore, the programming of the slower programming OTP memory cell of the first and second OTP memory cells is inhibited. A first bit value is stored in the latch circuit when the first OTP memory cell is the faster programming OTP memory cell, and a second bit value is stored in the latch circuit when the second OTP memory cell is the faster programming OTP memory cell. The hard program duration is timed out 820 and WP1 is returned to '0' from its Vpp value.

In some embodiments, using the data already latched, a $2^{nd}$ wordline containing OTP bit cells may now be programmed 825 using a standard OTP program flow (e.g., without a soft programming). For example, a third and fourth OTP memory cell may be connected to the latch circuit. The latch circuit performs a hard programming of the third OTP memory cell when the first bit value is stored by the latch circuit and performs a hard programming of the fourth OTP memory cell when the second bit value is stored by the latch circuit. Here, the OTP memory cell that is not programmed, or remain '0' bit, retain a relatively undisturbed oxide with high reliability. The first PUF programming is now complete and the cycle is repeated at the next OTP-PUF bit-cell pair address (for example: CS decoder is incremented 830).

The circuit determines 835 whether the last PUF address has been programmed. If all PUF bit-cell pairs have been addressed and programmed, the whole random bit-pattern is complete and ready for read out, and the process ends at 840. If a PUF bit-cell pair has not been addressed and programmed, then the process 800 returns to step 810 where a program voltage is applied to another PUF wordline in the OTP array.

Some OTP memory product arrays use the complementary OTP bit feature clearly seen in the OTP-PUF bit architecture. These are often security products using two OTP bit cells per digital bit, to securely store customer required data or software code. The PUF Stand-Alone architecture components described above are directly compatible to integrate into such an existing OTP product array thus enabling the addition of the PUF feature to an existing OTP product with minimal modifications. Presently, this PUF architecture style is described as the 'Integrated' PUF architecture.

Figure 9:
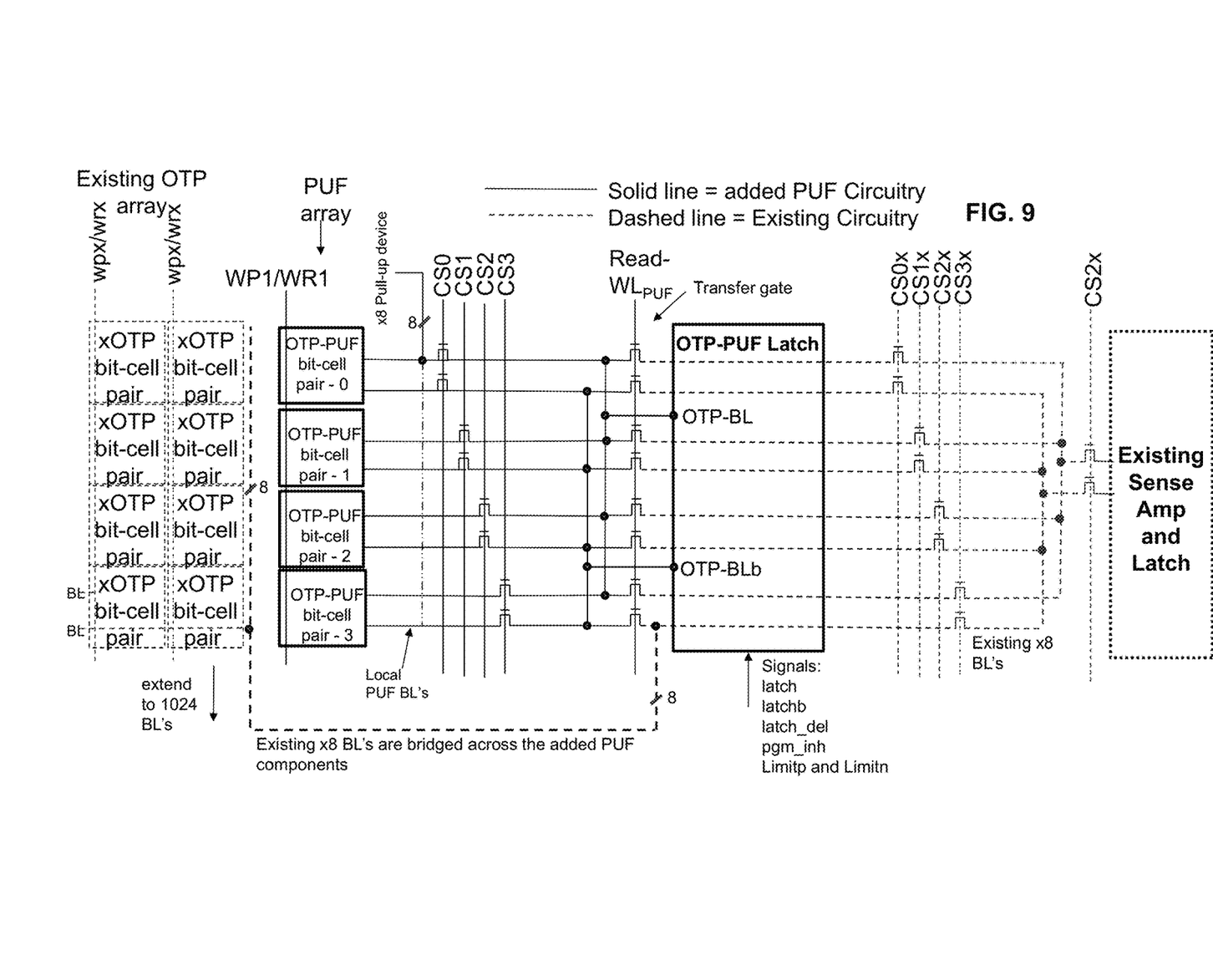
FIG. 9 shows an 'Integrated' architecture, where the PUF latch components are integrated into an existing OTP memory array thus adding the PUF feature to the product, in accordance with some embodiments.

FIG. 9 depicts the 'Integrated' PUF architecture. In the diagram 'x' denotes an existing component or signal prior to insertion of the PUF components. The added PUF components are drawn in solid line and existing components are dashed line. In the Integrated architecture, the tri-state output drivers in the latch are not needed and can be removed. The existing product sense amplifier is used instead for Read functions. The PUF-latch is disabled for read functions by putting all pgm_inh signals to logic '1' during read. The transfer gate is enabled during PUF read (driven by signal Read-$WL_{PUF}$) which is provided from logic external to the PUF circuit, but inside the Integrated product, when it is desired to read the PUF data content. The transfer gate connects the PUF local BL's to the existing BL's which access to the existing product sense amplifier. This is so that current in the OTP-PUF bit is routed to the existing sense amplifier. Also, during the read, WP1 and WR1 are enabled as per the read description in above paragraphs. The wordlines in the existing OTP memory array wpx/wrx are all grounded during PUF read.

In the Integrated architecture, the PUF latches are not assembled in an arrayed configuration (as per Stand-Alone architecture) but instead deployed in a single string along the edge of the existing OTP product array in the direction of the wordline WP1. For example, one latch placed per every 8 adjacent OTP bit cells along WP1.

Each local PUF BL sits as an extension to the existing BL, but is physically isolated from the existing BL, maintaining the low capacitance benefit.

An example product array has 1024 BL's servicing 512 data bits (×2 OTP bit-cells per data bit). Each PUF latch services 8 BL's (8 bit-cells, equal to 4 PUF data bits). The required number of latches in the string is therefore 1024 (BL)/8(cells)=128 latches, creating 512 random PUF data bits per PUF wordline. FIG. 9 demonstrates the topology for a short section of the array (8 BL's) which connect to just one of the 128 latches.

During PUF programming, the transfer gate is disabled (Read-$WL_{PUF}$=0V) and the wordlines in the existing OTP memory array wpx/wrx are all grounded. WP1 and WR1 are activated as previously described for PUF programming. Also, CS0-3 are appropriately activated. Signal 'pgm_inh' is set to '0' for the active latch. Due to the transfer gate being off, the OTP-PUF latch bit line connections OTP-BL and OTP-BLb have low capacitance thus maintaining the high speed feedback responses seen in the Stand-Alone version of the architecture. The OTP-PUF latch signals, latch, latchb, latch-del, pgm_inh, Limitn and Limitp are all provided from an adjacent circuit, not shown or described here. However, the requirements for these signals are the same as for the Stand-Alone architecture previously described. The program flow is the same as in FIG. 8. The mentioned $2^{nd}$ OTP row may be added alongside the WL1/WR1 PUF row (not detailed in FIG. 9), or could be part of the existing OTP array.

The foregoing descriptions of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A physically unclonable function (PUF) circuit, comprising:
   a first one-time programmable (OTP) memory cell;
   a second OTP memory cell; and
   a latch circuit connected to the first and second OTP memory cells, the latch circuit configured to:
   initiate programming of the first and second OTP memory cells;
   detect a faster programming OTP memory cell of the first and second OTP memory cells;
   inhibit programming of a slower programming OTP memory cell of the first and second OTP memory cells; and
   store a first bit value when the first OTP memory cell is the faster programming OTP memory cell and a second bit value when the second OTP memory cell is the faster programming OTP memory cell.

2. The PUF circuit of claim 1, wherein:
   the latch circuit configured to initiate the programming of the first and second OTP memory cells includes the latch circuit being configured to initiate a soft programming for the first OTP memory cell and the second OTP memory cell using a first current level; and
   the latch circuit is further configured to perform a hard programming of the faster programming OTP memory cell using a second current level higher than the first current level.

3. The PUF circuit of claim 2, wherein:
the PUF circuit further includes a third OTP memory cell and a fourth OTP memory cell connected to the latch circuit; and
the latch circuit is further configured to perform a hard programming of the third OTP memory cell when the first bit value is stored by the latch circuit and perform a hard programming of the fourth OTP memory cell when the second bit value is stored by the latch circuit.

4. The PUF circuit of claim 1, wherein the latch circuit is configured to inhibit the programming of the slower programming OTP memory cell by increasing a bit line voltage of the slower programming OTP memory cell to lower a field on an oxide of the slower programming OTP memory cell.

5. The PUF circuit of claim 1, wherein the latch circuit is configured to inhibit the programming of the slower programming OTP memory cell by shutting off a pass device on a bit line of the slower OTP memory cell to disable a program current path of the slower OTP memory cell.

6. The PUF circuit of claim 1, wherein the latch circuit is configured to detect the faster programming OTP memory cell based on conductivities of the first and second OTP memory cells over time.

7. The PUF circuit of claim 1, wherein the latch circuit includes a tri-state driver configured to output the first bit value or the second bit value stored in the latch circuit.

8. The PUF circuit of claim 1, wherein the first OTP memory cell, the second OTP memory cell, and the latch circuit form a symmetrical structure.

9. The PUF circuit of claim 1, further comprising:
a pass device connecting the latch circuit to the first OTP memory cell; and
a pull-up device connected between the pass device and the first OTP memory cell.

10. The PUF circuit of claim 1, wherein:
the first and second OTP memory cells form a first bit cell pair; and
the PUF circuit further includes:
a second bit cell pair including a third OTP memory cell and a fourth OTP memory cell; and
a decoder configured to selectively connect the latch circuit to the first bit cell pair and the second bit cell pair.

11. A method for generating a bit value, comprising:
initiating, by a latch circuit connected to a first one-time programmable (OTP) memory cell and a second OTP memory cell, programming of the first and second OTP memory cells;
detecting, by the latch circuit, a faster programming OTP memory cell of the first and second OTP memory cells;
inhibiting, by the latch circuit, programming of a slower programming OTP memory cell of the first and second OTP memory cells; and
storing, by the latch circuit, a first bit value when the first OTP memory cell is the faster programming OTP memory cell and a second bit value when the second OTP memory cell is the faster programming OTP memory cell.

12. The method of claim 11, wherein:
initiating the programming of the first and second OTP memory cells includes initiating a soft programming for the first OTP memory cell and the second OTP memory cell using a first current level; and
the method further includes initiating a hard programming of the faster programming OTP memory cell using a second current level higher than the first current level.

13. The method of claim 12, wherein:
the latch circuit is further connected to a third OTP memory cell and fourth OTP memory cell; and
the method further includes performing a hard programming of the third OTP memory cell when the first bit value is stored by the latch circuit and performing a hard programming of the fourth OTP memory cell when the second bit value is stored by the latch circuit.

14. The method of claim 11, wherein inhibiting programming of the slower programming OTP memory cell includes increasing a bit line voltage of the slower programming OTP memory cell to lower a field on an oxide of the slower OTP memory cell.

15. The method of claim 11, wherein inhibiting programming of the slower OTP memory cell includes shutting off a pass device on a bit line of the slower OTP memory cell to disable a program current path of the slower OTP memory cell.

16. The method of claim 11, further comprising outputting the first bit value or the second bit value from the latch circuit using a tri-state driver.

17. The method of claim 11, wherein detecting the faster programming OTP memory cell is based on conductivities of the first and second OTP memory cells over time.

18. The method of claim 11, wherein the latch circuit, the first OTP memory cell, and the second OTP memory cell form a physical unclonable function (PUF) circuit that includes a symmetrical structure.

19. An electronic device, comprising:
a plurality of physically unclonable function (PUF) circuits, each PUF circuit including:
a first one-time programmable (OTP) memory cell;
a second OTP memory cell; and
a latch circuit connected to the first and second OTP memory cells, the latch circuit configured to:
initiate programming of the first and second OTP memory cells;
detect a faster programming OTP memory cell of the first and second OTP memory cells;
inhibit programming of a slower programming OTP memory cell of the first and second OTP memory cells; and
store a first bit value when the first OTP memory cell is the faster programming OTP memory cell and a second bit value when the second OTP memory cell is the faster programming OTP memory cell.

20. The electronic device of claim 19, wherein:
the latch circuit configured to initiate the programming of the first and second OTP memory cells includes the latch circuit being configured to initiate a soft programming for the first OTP memory cell and the second OTP memory cell using a first current level; and
the latch circuit is further configured to initiate a hard programming of the faster programming OTP memory cell using a second current level higher than the first current level.

* * * * *